United States Patent
Ward et al.

(10) Patent No.: US 9,927,520 B1
(45) Date of Patent: Mar. 27, 2018

(54) METHOD AND SYSTEM FOR CLOSE PROXIMITY COLLISION DETECTION

(71) Applicant: Brunswick Corporation, Lake Forest, IL (US)

(72) Inventors: Aaron J. Ward, Oshkosh, WI (US); Matthew David Jarrell, Oshkosh, WI (US)

(73) Assignee: Brunswick Corporation, Mettawa, IL (US)

( * ) Notice: Subject to any disclaimer, the term of this patent is extended or adjusted under 35 U.S.C. 154(b) by 220 days.

(21) Appl. No.: 14/807,217

(22) Filed: Jul. 23, 2015

(51) Int. Cl.
G01S 7/04 (2006.01)
G01S 13/93 (2006.01)
G01S 13/86 (2006.01)
G01S 13/88 (2006.01)

(52) U.S. Cl.
CPC ............ G01S 13/9307 (2013.01); G01S 7/04 (2013.01); G01S 13/862 (2013.01); G01S 13/886 (2013.01)

(58) Field of Classification Search
CPC .... G01S 13/93; G01S 13/9307; G01S 13/862; G01S 13/886; G01S 7/04
See application file for complete search history.

(56) References Cited

U.S. PATENT DOCUMENTS

| | | | |
|---|---|---|---|
| 3,690,767 A | 9/1972 | Missio et al. | |
| 3,697,987 A * | 10/1972 | Arthur | G01S 13/9307 342/182 |
| 3,707,717 A * | 12/1972 | Frielinghaus | G01S 1/02 342/109 |
| 4,623,966 A * | 11/1986 | O'Sullivan | G01S 7/22 342/182 |
| 5,074,488 A | 12/1991 | Coiling | |
| 5,274,378 A | 12/1993 | O'Conner | |
| 5,993,110 A | 8/1999 | Tang et al. | |
| 6,268,829 B1 | 7/2001 | Weckstrom | |
| 6,492,933 B1 | 12/2002 | McEwan | |
| 6,677,889 B2 | 1/2004 | Van Rees et al. | |
| 6,750,815 B2 | 6/2004 | Michaelson et al. | |
| 7,267,068 B2 | 9/2007 | Bradley et al. | |
| 7,476,862 B2 | 1/2009 | Staerzl | |
| 7,561,886 B1 * | 7/2009 | Gonring | G01C 1/00 340/514 |

(Continued)

OTHER PUBLICATIONS

"Direction Finding System" by Harry Lythall-SMOVPO; retrieved on Nov. 7, 2005 from http://web.telia.com/-u85920178/rx/df-00.htm, pp. 1-10.

(Continued)

Primary Examiner — Timothy A Brainard
Assistant Examiner — Daniel P Malley, Sr.
(74) Attorney, Agent, or Firm — Andrus Intellectual Property Law, LLP (57) ABSTRACT

A method of detecting a collision of the marine vessel includes sensing using distance sensors to determine whether an object is within a predefined distance of a marine vessel, and determining a direction of the object with respect to the marine vessel. The method further includes receiving a propulsion control input at a propulsion control input device, and determining whether execution of the propulsion control input will result in any portion of the marine vessel moving toward the object. A collision warning is then generated.

13 Claims, 4 Drawing Sheets

(56) References Cited

U.S. PATENT DOCUMENTS

| | | | | |
|---|---|---|---|---|
| 2010/0076683 A1* | 3/2010 | Chou | ........................ | B60R 1/00 |
| | | | | 701/301 |
| 2010/0292871 A1* | 11/2010 | Schultz | .................. | G01C 21/00 |
| | | | | 701/3 |
| 2011/0138277 A1 | 6/2011 | Grant et al. | | |
| 2011/0148667 A1* | 6/2011 | Yeh | ........................ | G05G 9/047 |
| | | | | 341/20 |
| 2011/0172858 A1* | 7/2011 | Gustin | .................. | B63H 21/213 |
| | | | | 701/21 |
| 2012/0072059 A1* | 3/2012 | Glaeser | ................... | B63B 43/18 |
| | | | | 701/21 |

OTHER PUBLICATIONS

Banner Engineering Corp., U-GAGE T30 Series with Analog and Discrete Outputs P/N 57438 Rev. C, pp. 1-12, Jan. 2003.
Delphi Electronically Scanning Radar, http://delphi.com/manufacturers/auto/safety/active/electronically-scanning-radar, website visited Jul. 16, 2015.
Bosch Parkpilot—System, http://rb-aa.bosch.com/boaa-uk/Product.jsp?, website visited Jul. 16, 2015.

* cited by examiner

METHOD AND SYSTEM FOR CLOSE PROXIMITY COLLISION DETECTION

BACKGROUND

U.S. Pat. No. 6,750,815 discloses a navigational system for surface vessels that provides warning of impending grounding occurrences. A data base of bottom contours and submerged obstructions is compared to various indicators of the surface vessel's position and motion to provide alerts and to display bottom hazards ahead of the vessel.

U.S. Pat. No. 7,476,862 discloses two sensor units mounted on opposite sides of a transom of a boat and directed to a common location behind the boat. The field of view of the two sensors overlaps behind the marine propulsion unit of the boat to detect the presence of a heat emitting object, such as a mammal. Housing structures contain infrared sensing elements, lenses, and light shields. Signals from four infrared sensing elements are received by a controller which reacts, with an alarm signal, when at least two of the four sensors detect a heat emitting object within their individual fields of view. False triggering can be reduced by not providing an alarm signal if only the two most inboard sensors detect the heat emitting object.

U.S. Pat. No. 5,274,378 discloses a relative velocity indicator system for assistance in the docking of vessels using a radar sensor providing a relative velocity signal indicative of the relative velocity between a ship and a reference, such as a dock. A wireless transmitter associated with the radar sensor receives said relative velocity signal and transmits a signal indicative of said relative velocity signal. A portable receiver and indicator unit carried by the captain of the vessel has a receiver for receiving the transmitted signal and an indicator arranged to receive, from said receiver, a receiver signal indicative of the transmitted signal and, thereby, of the relative velocity signal for indicating the relative velocity between ship and reference.

U.S. Pat. No. 3,707,717 discloses a system for generating correction command signals relative to the berthing velocity profile of a vehicle in approach of a docking position. A Doppler radar system including a radar transceiver projects signals between the docking position and the vehicle and respondingly generates Doppler shift frequency signals indicative of the velocity of the vehicle and the relative displacement thereof. A radar counter having preset initial counts stored therein indicative of anticipated initial berthing conditions, responds to the frequency shift signals by counting down from the initial counts in accordance with the Doppler shift. Means is included for updating the radar counter in accordance with actual conditions and includes a sonic detector which periodically projects sonic signals between the vehicle and the docking position and respondingly generates corrected count signals in accordance with the reflected sonic energy, indicative of actual distance of the vehicle to the docking position. Means is utilized which periodically transfers the corrected count signals to the radar counter, correcting for errors between actual and preset initial conditions.

U.S. Pat. No. 7,561,886 discloses a method by which a position of a marine vessel can be determined relative to a stationary object, such as a dock. Two position sensors are attached to a marine vessel and a microprocessor, onboard the marine vessel, computes various distances and angular relationships between the position sensors on the marine vessel and stationary transponders attached to the fixed device, such as a dock. The various dimensions and angular relationships allow a complete determination regarding the location and attitude of a marine vessel relative to the dock. This information can then be used by a maneuvering program to cause the marine vessel to be berthed at a position proximate the dock.

U.S. Pat. No. 3,690,767 discloses a docking system for large ocean-going vessels, which comprises a laser pulse range radar system having a laser transmitter and receiver, a retroreflector, and receiving and transmitting optics. Two such systems are disposed on a dock. The retroreflectors are disposed on the bow and stern of a vessel. The laser systems share a time interval meter, a computer, and a display panel. The lasers track the retroreflectors as the ship approaches the dock, and the time interval between the transmitted and received pulses is measured. Computations are made and the velocity of the approaching vessel, its distance from the dock, and the vessel position with reference to the dock are continually displayed. This information is then transmitted to the ship's captain.

U.S. Pat. No. 5,933,110 discloses a portable attitude determination apparatus and method that can be used with a ship docking system. At least two receivers on a vessel receive Global Positioning System (GPS) satellite data. GPS carrier phase measurements are used to determine attitude (i.e., roll, pitch and yaw angles) of a moving platform. The phase measurements are processed to determine a precise vector from one receiver phase center to the other. The azimuth and elevation of a baseline vector is then computed. Float ambiguities between the two receivers are determined, and are used to provide initial estimates of antenna baseline length and attitude. A search procedure is then employed to find the actual integer ambiguities. Only GPS observables are needed; no other external data input is required.

U.S. Pat. No. 6,268,829 discloses a Doppler Direction Finder comprising at least one antenna (52) spaced from a location point (53). The at least one antenna (52) is arranged in use to be rotated about the rotation point (53). The at least one antenna (52) is arranged to provide a first output signal comprising a signal received by said at least one antenna (52) combined with the Doppler Shift component. There are means (70) for providing a second output signal comprising the received signal without the Doppler Shift component. Processing means (54-82) process the first and second signals to obtain the Doppler Shift component. Determining means (88) determine from the Doppler Shift component the direction from which the received signal is received.

U.S. Pat. No. 6,492,933 discloses a dual channel microwave sensor that employs single sideband Doppler techniques in innumerable vibration, motion, and displacement applications. When combined with an active reflector, the sensor provides accurate range and material thickness measurements even in cluttered environments. The active reflector can also be used to transmit multi-channel data to the sensor. The sensor is a homodyne pulse Doppler radar with phasing-type Doppler sideband demodulation having a 4-decade baseband frequency range. Ranging is accomplished by comparing the phase of the Doppler sidebands when phase modulated by an active reflector. The active reflector employs a switch or modulator connected to an antenna or other reflector. In one mode, the active reflector is quadrature modulated to provide SSB reflections. Applications for the low-cost system include a mechanical motion/rotation sensor, a robust security alarm, a throat microphone, a stereo guitar pickup, a direction sensitive cardiac monitor, an electronic dipstick, a material thickness/dielectric sensor, a metal smoothness meter, a non-contact electronic readout, an RFID tag, silent "talking" toys, a passive-emitter data link, a beam interrupter, and a gold nugget finder.

U.S. Pat. No. 7,267,068 discloses a marine vessel that is maneuvered by independently rotating first and second marine propulsion devices about their respective steering axes in response to commands received from a manually operable control device, such as a joystick. The marine propulsion devices are aligned with their thrust vectors intersecting at a point on a centerline of the marine vessel and, when no rotational movement is commanded, at the center of gravity of the marine vessel. Internal combustion engines are provided to drive the marine propulsion devices. The steering axes of the two marine propulsion devices are generally vertical and parallel to each other. The two steering axes extend through a bottom surface of the hull of the marine vessel.

U.S. Patent Application Publication No. 2011/0138277 discloses a method of generating haptic effects on a device including detecting the presence of an object near an input area of the device and generating a haptic effect on the device in response to the presence detection.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a method of detecting a collision of the marine vessel includes sensing using distance sensors whether an object is within a predetermined distance of a marine vessel, and determining a direction of the object with respect to the marine vessel. The method further includes receiving a propulsion control input at a propulsion control input device, and determining whether execution of the propulsion control input will result in any portion of the marine vessel moving toward the object. A collision warning is then generated.

One embodiment of a system for detecting a collision in a marine vessel includes a propulsion control input device that receives input from an operator to control propulsion of a marine vessel, at least one distance sensor that senses a distance of an object from the marine vessel, and a control unit that is operably connected to the propulsion control input device and the distance sensor. The control unit determines if the distance of the object is less than a predefined distance and if execution of the input received at the propulsion control input device will result in a collision. The system further includes a collision warning indicator operably connected to the control unit that provides a collision warning.

Various other features, objects and advantages of the invention will be made apparent from the following description taken together with the drawings.

BRIEF DESCRIPTION OF THE DRAWINGS

The present disclosure is described with reference to the following figures. The same numbers are used throughout the figures to reference like features and like components.

DETAILED DESCRIPTION OF THE DRAWINGS

In the present description, certain terms have been used for brevity, clarity and understanding. No unnecessary limitations are to be inferred therefrom beyond the requirement of the prior art because such terms are used for descriptive purposes only and are intended to be broadly construed.

Figure 1:
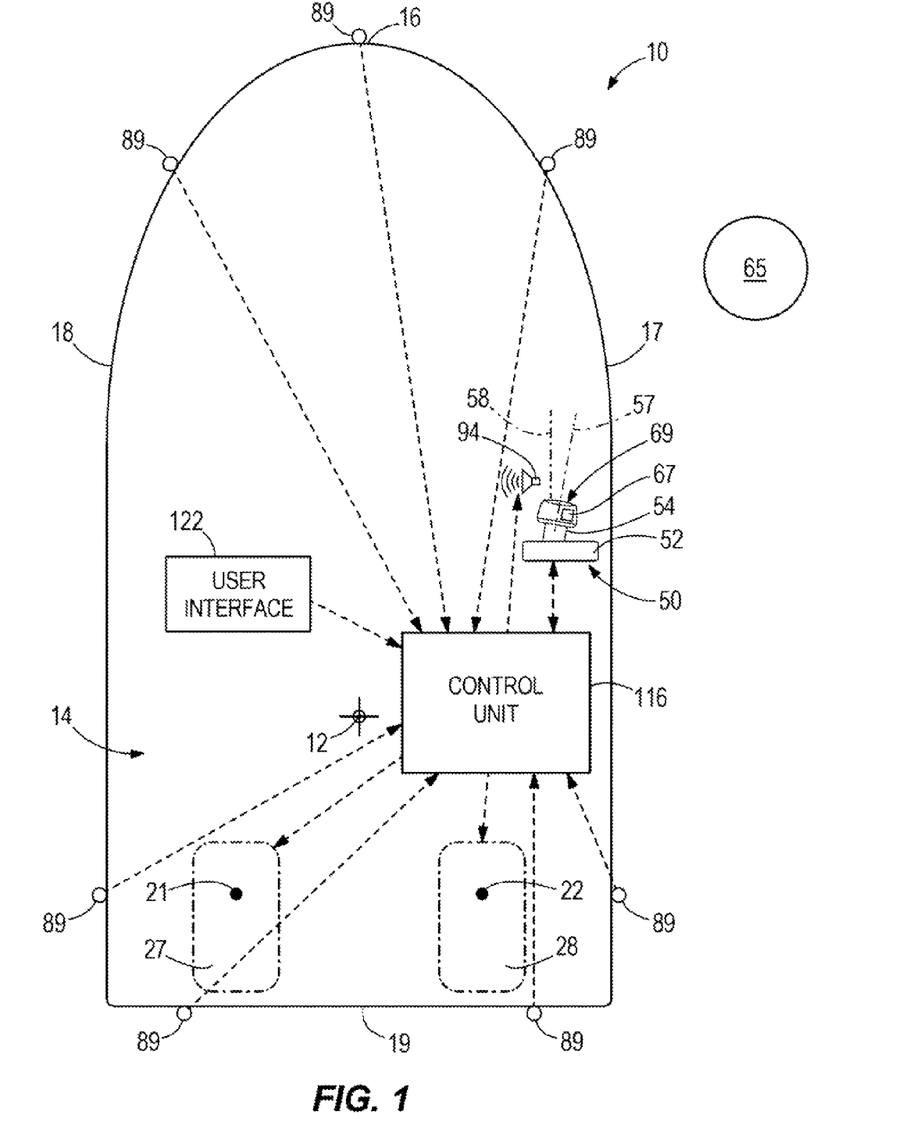
FIG. 1 is a schematic representation of a marine vessel having a collision detection system.

FIG. 1 schematically depicts an embodiment of a marine vessel 10 having a collision detection system 14 including a joystick device 50. The collision detection system 14 is designed to operate when the marine vessel 10 is traveling at low speeds, such as under 5-10 mph where a joystick device 50 would be used to steer the marine vessel 10. The speed limit chosen for engagement of the collision detection system 14 may be based on the vessel type and size. The collision detection system 14 is configured to sense whether the object 65 is within a relatively short predetermined distance of the marine vessel 10—such as within 10 feet, within 5 feet, or even within 3 feet of the marine vessel 10—and determine a direction of the object 65 with respect to the marine vessel.

Upon receiving a propulsion control input from an operator via a propulsion control input device, such as the joystick 50, the collision detection system 14 determines whether execution of the propulsion control input will result in the marine vessel moving toward the object, thereby causing a collision. In various embodiments, a propulsion control input could be input from a joystick device 50, a throttle lever, a steering wheel, or the like. If the control unit 116 determines that execution of the propulsion control input will result in a collision, a collision warning is generated. The collision warning may take any form that provides notification to the operator that the propulsion control input will cause a collision, including an auditory warning through a speaker 94 at or near the helm, a visual warning on a display or indicator light at or near the helm, or a haptic warning. An exemplary haptic warning is a vibration in the relevant propulsion control input device used to provide the input that will result in the collision. For example, the joystick device 50 may be equipped with a vibrator 67 in the handle 54 that causes the handle 54 to vibrate to provide a collision warning to the operator when the operator provides an input with the joystick device 50 that will result in a collision.

It should be understood that, as used herein, the term "collision" refers to any contact between the marine vessel 10 and another object, and is not confined to unwanted contact. The collision detection and warning system 14 may be used to provide assistance in situations where the operator is intentionally or unintentionally approaching an object 65. For example, in a docking situation where the operator is intentionally approaching an object 65, such as a dock or a buoy, the system 14 may be useful in informing the operator of what input is needed in order to cause the marine vessel 10 to collide, or make contact with, the dock or buoy. Similarly, the system 14 can also be provide useful information to a operator to avoid collision, or making contact, with an object 65, such as when navigating though tight spaces to avoid collision with other vessels.

It should also be understood that the particular configuration of the marine vessel 10, and the collision detection system 14 shown and described, is one exemplary embodiment of such a system arrangement. It is possible to apply the concepts described in the present disclosure with substantially different configurations for marine vessels and control systems therefore. For example, the marine vessel 10 depicted in FIG. 1 has first and second propulsion devices 27, 28. It should be understood that the concepts disclosed in the present disclosure are applicable to a marine vessel having any number of marine propulsion devices and any configuration of a propulsion device, such as a propeller, impeller, pod drive, or the like, which may be driven by any marine drive, such as an outboard motor, an inboard drive, or an inboard/outboard drive (or stern drive), as will be apparent to those of ordinary skill in the art. In addition, the collision detection systems 14 described herein include certain operational structures such as one or more distance sensors and a control unit, which may take on various arrangements and be provided in various forms. It should also be understood that the concepts disclosed in the present disclosure are capable of being implemented with various types of propulsion control input devices and systems, such as the depicted joystick device 50, a steering wheel, a throttle lever, or the like.

In FIG. 1, a marine vessel 10 having center of gravity along axis 12 is schematically illustrated. The marine vessel 10 has two marine drives 27 and 28, each having a steering axis, 21 and 22 respectively. The operation of the marine drives 27 and 28, including their rotation about steering axes 21 and 22, is controlled by the control unit 116 in response to input from a steering device, such as the joystick device 50. The collision detection system 14 further includes a user input device 122 which may be used to provide control commands to activate the system, control its functionality, and/or generating a collision warning to an operator. For example, the user input device 122 may enable an operator to provide input to turn on or off the collision detection system 14, and to control the distance at which the collision detection system 14 provides warning of an object. In exemplary embodiments, the user input device 122 may comprise one or more of a display screen, a touch screen, push buttons, a keyboard, or the like. Alternatively or additionally, the user input device 122 may further include remotely operated or wireless devices not physically installed on the marine vessel 10, such as a fob or other type of remote activator or controller. In another embodiment, the user input device 122 may be combined with the joystick device 50, and/or the joystick device 50 may incorporate user input devices other than just the handle 54, as disclosed in certain embodiments herein.

Figure 3A:
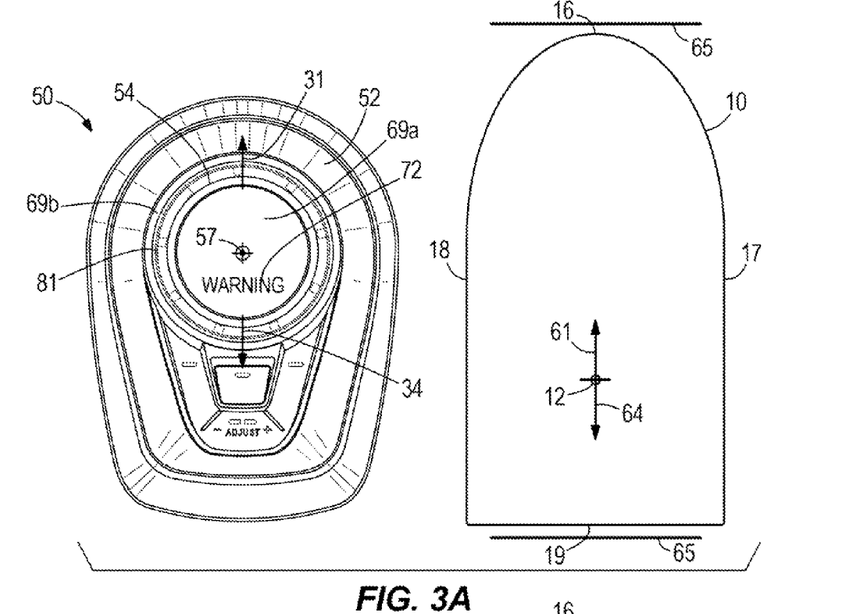
FIGS. 3A and 3B illustrate one embodiment of a method and system of detecting a collision of a marine vessel.
Figure 3B:
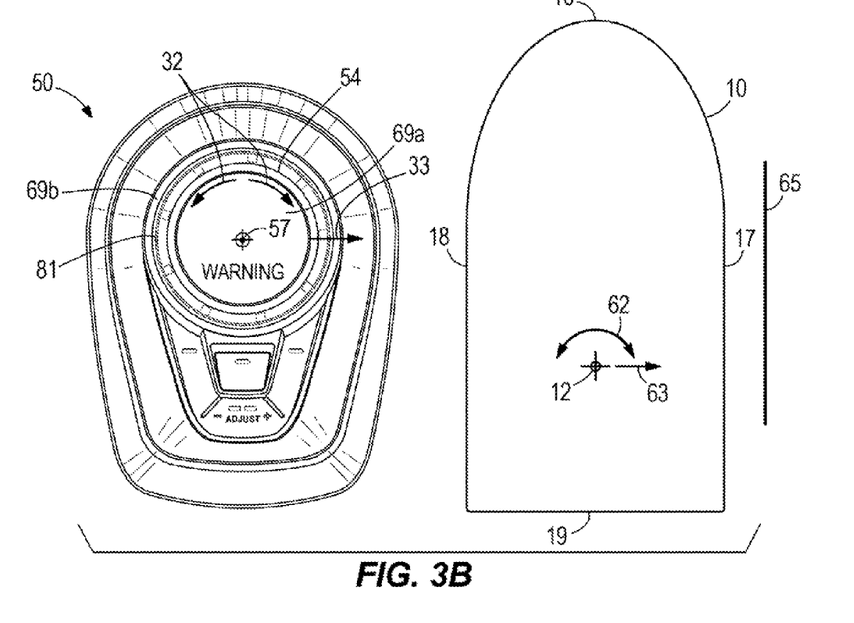

The collision detection system 14 of FIGS. 1, 3A, and 3B further includes a propulsion control input device in the form of a joystick device 50 having a handle 54 that can move in various directions. The handle 54 extends from a housing 52. In the depicted embodiment, the handle 54 extends upward from the housing 52 along an axis 57. The handle 54 is depicted in a tilted position, away from its upright center axis 58, for example providing a control command to the control unit 116. As will be known to one of skill in the art, the joystick device 50 may be used to control the steering and propulsion system to affect any range of translational and/or rotational motion of the marine vessel 10. Motions of the joystick device 50 include tilt in the forward, back, right, and left directions, and any combinations thereof (such as tilt forward to the right, or back to the left, etc.) and rotation of the handle 54 about the axis 57, which can be combined with the tilt motions. The corresponding motions of the marine vessel 10 as controlled by movements of the joystick device 50 include translational movements in four basic directions, including forward axial motion, reverse axial motion, port lateral motion, starboard lateral motion, and any direction therebetween. A marine vessel 10 may also be controlled by the joystick device 50 to perform rotational movement about a vertical axis of the marine vessel 10, such as axis 12 along the center of gravity of the marine vessel 10. In one embodiment, rotation of the handle 54 of the joystick device 50 about axis 54 causes rotational movement of the vessel 10 about its center of gravity 12.

The collision detection system 14 further includes a control unit 116. The control unit 116 includes a memory, a programmable processor, and programmable input/output peripherals. As is conventional, the processor can be communicatively connected to a computer readable medium that includes volatile and/or nonvolatile memory upon which computer readable code is stored. The processor can access the computer readable code and the computer readable medium upon executing the code carries out functions as described herein below. The control unit 116 is operatively connected to the various elements of the propulsion and steering control system 14, including the distance sensors 89, the user input device(s) 122, the joystick device 50, and the first and second marine drives 27 and 28. The control unit 116 can receive inputs and send outputs via a CAN bus as described in U.S. Pat. No. 6,273,771 which is incorporated herein by reference in its entirety. In other examples, the control unit 116 is connected to various portions of the system 14, as well as other devices on the marine vessel 10, via wireless communication rather than by a wired CAN bus.

The collision detection system 14 includes sensors that detect the existence of an object 65 in proximity of the marine vessel 10, and measure the distance of that object 65 from the marine vessel 10. In the embodiment of FIG. 1, the collision detection system 14 includes seven distance sensors positioned around the marine vessel 10. In the depicted embodiment, the marine vessel 10 has one distance sensor 89 positioned on the bow 16 and two distance sensors 89 positioned on the stern 19. Additionally, two distance sensors 89 are positioned on the starboard side 17 of the marine vessel 10, and two distance sensors 89 are positioned on the port side 18. The distance sensors 89 may be any type of sensor appropriate for the disclosed application of sensing the distance of an object 65 from a marine vessel. For example, the distance sensors 89 may be any combination of radar sensors, ultrasonic sensors lidar sensors, optic sensors, infrared sensors, or the like. One of skill in the art will recognize that various types of sensors may be employed in the collision detection system disclosed herein, and that the references incorporated herein disclose the use of a variety of appropriate sensors, including at U.S. Pat. Nos. 7,561,886, 6,750,815, 3,690,767, 3,707,717, 5,274,378, and 6,268,829.

Each distance sensor 89 communicates with the control unit 116 about the distance and location of an object 65 within the range of each distance sensor 89. The control unit 116 may determine the direction and distance of an object 65 with respect to the marine vessel 10 based on input from each distance sensor 89 and knowledge of the location of each distance sensor 89 on the marine vessel 10. Thus, calculation of the location of the object 65 with respect to the marine vessel 10 accounts for the shape of the marine vessel and the location of the distance sensor 89 with respect to the edge of the marine vessel in the direction of the object 65. Such computation may be performed in the control unit 116, or may be performed by a sub controller or logic unit associated with the sensor 89.

Figure 2A:
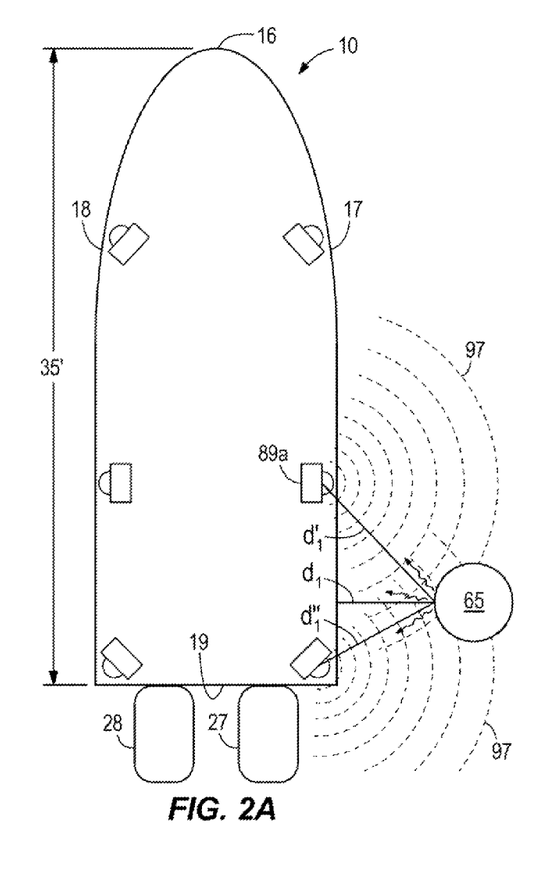
FIG. 2A is a schematic representation of a marine vessel having a collision detection system with an exemplary arrangement of distance sensors.

The distance sensors 89 may be positioned or arranged in any number of ways around the marine vessel, and the position and number of distance sensors 89 utilized in a collision detection system 14 may depend on the type and model of sensor employed. FIG. 2a depicts one embodiment of a marine vessel 10 equipped with six distance sensors 89 that are radar sensors 89a, with three radar sensors on the starboard side 17 and three radar sensors on the port side 18. In one exemplary embodiment, the radar distance sensors 89a may be Delphi electronically scanning radar (ESR) modules. However, the radar distance sensors 89a may be any type of radar sensor appropriate for sensing the relatively short range of distances appropriate for the collision detection system 14 disclosed herein, such as distances in a range of 10 feet or less from the marine vessel 10. The marine vessel in FIG. 2A is 35 feet long, and the exemplary arrangement of radar sensors 89a may provide 100% sensor coverage for detection of an object within a predetermined distance of 5 feet from the vessel. Thus, the exemplary arrangement of radar distance sensors 89a can accurately locate an object located within the predetermined distance at any side of the marine vessel 10, and can accurately determine how far the object is from the location of the sensor performing the measurement. The radar distance sensors 89a transmit a radar signal, which is generally projected in a conical or semicircular area off the side of the vessel 10, such as that represented by dashed lines 97. The radar signal 97 bounces off the object 65 and is received back at one or more of the radar distance sensors 89a. The shortest distance $d_1$ between the object 65 and the marine vessel 10 would be determined based on the distances $d_1'$ and $d_1''$ between each of the sensors 89a and the object, and accounting for the position of the sensors with respect to one another and with respect to the marine vessel 10.

Figure 2B:
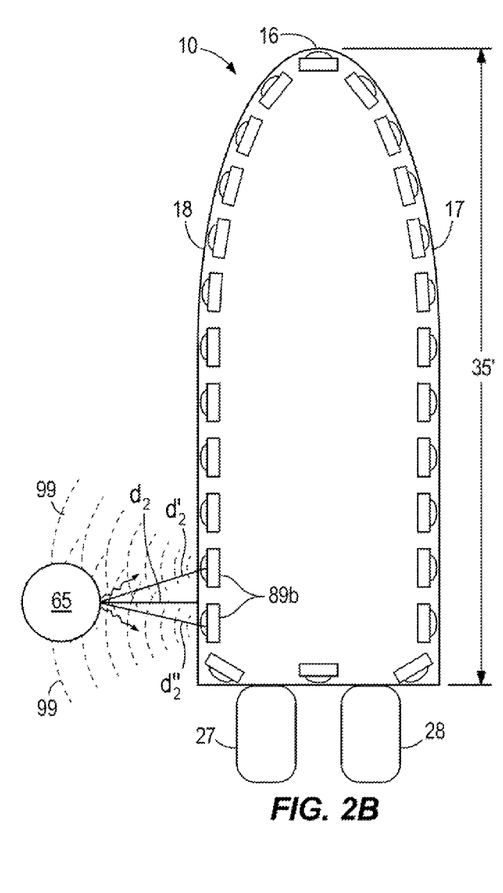
FIG. 2B is a schematic representation of a marine vessel having a collision detection system with another exemplary arrangement of distance sensors.

Similarly, FIG. 2B depicts another exemplary embodiment of a marine vessel 10 equipped with distance sensors 89, wherein the sensors are ultrasonic distance sensors 89b. Specifically, the embodiment of FIG. 2B has numerous ultrasonic distance sensors 89b spread around the outer circumference of the marine vessel 10, including three ultrasonic sensors 89b on the stern of the vessel 10, eleven ultrasonic sensors 89b on each of the starboard 17 and port 18 sides of the vessel 10, and one ultrasonic sensor 89b at the bow 16. The plurality of ultrasonic distance sensors 89b operate such that, when the marine vessel 10 is maneuvered within a predetermined distance of the object 65, the ultrasonic sensors 89b will measure the precise distances $d_2'$ and $d_2''$ between the sensors and the object 65. The ultrasonic sensors 89b are ultrasonic transceivers, emitting generally a conical ultrasonic signal, such as that represented by dashed lines 99, and receiving the ultrasonic signal 99 that bounces off the object 65. The distances $d_2'$ and $d_2''$ between each of the sensors 89b and the object 65 is calculated based on the amount of time it takes for the echo signal to be received at each sensor 89b, respectively. The shortest distance $d_2$ between the object and the vessel is then calculated based on the one or more distances $d_2'$ and/or $d_2''$ of the received signals and the known vessel shape and arrangement of ultrasonic distance sensors 89b. The ultrasonic distance sensors 89b may be any type of ultrasonic sensor appropriate for sensing the relatively short range of distances appropriate for the collision detection system 14 disclosed herein. In one embodiment, the ultrasonic distance sensors 89b are optimized for sensing distances in the range of 10 feet or less, and in some embodiments the ultrasonic distance sensors 89b are optimized for sensing objects that are less than 5 feet from the marine vessel 10. In one exemplary embodiment, the ultrasonic distance sensors 89b may be Bosch URF7 ultrasonic sensors.

The marine vessel 10 may be equipped with any type of distance sensor 89, and/or combination of distance sensor types, and configured in any arrangement that can perform the function of detecting an object 65 in proximity to the marine vessel, such as any number of radar distance sensors 89a or sonar distance sensors 89b, or any combination thereof. As is exemplified by comparing FIG. 2A to FIG. 2B, radar distance sensors 89a generally have a broader range, or sensing field, than ultrasonic distance sensors 89b. Thus, more ultrasonic distance sensors 89b are required than radar sensors 89a to provide the same coverage around the circumference of the marine vessel 10. However, the ultrasonic distance sensors 89b are capable of providing increased accuracy, in comparison to the radar sensors 89a. While the embodiments depicted in FIGS. 2A and 2B provide 100 percent sensing coverage around the marine vessel 10, certain embodiments of the collision detection system 14 may not provide such thorough coverage. For example, some embodiments designed to provide docking assistance may be configured to detect only a large and continuous objects, such as the edge of a dock. In such embodiments, sensor coverage may be provided only at key locations around the marine vessel 10, and the collision detection system 14 may operate with fewer sensors than the embodiments depicted in FIGS. 2A and 2B. The distance sensors 89 may be placed at various locations on the sides of the marine vessel 10, and may be placed above the surface of the water or below the surface of the water. In one embodiment, the distance sensors 89 are positioned along the hull of the marine vessel 10 between 2 and 4 feet above the surface of the water. Such placement is optimized for detection of docks, buoys, other vessels, or other elements that an operator may intentionally try to approach.

FIGS. 3A and 3B exemplify operation of one embodiment of the collision detection system 14. In FIG. 3A, objects 65 exist within the predetermined distance in front of and behind the marine vessel 10. In the depicted situation, the collision detection system 14 will generate a collision warning if an operator inputs a command at the joystick 50 to cause the vessel 10 to go in the forward direction 61 by moving the joystick handle 54 in the direction of arrow 31, or in the reverse direction 64 by moving the handle 54 in the direction of arrow 34. In FIG. 3B the object 65 is positioned on the starboard side 17 of the marine vessel 10. In this instance, the collision detection system 14 generates a collision warning if an operator provides steering input at the joystick 50 that would cause any portion of the marine vessel 10 to move toward the object 65. Thus, a collision warning would be generated if the operator instructed the vessel to move laterally in the starboard direction 17, along arrow 63, by pushing the handle 54 in the rightward direction of arrow 33. Likewise, if an operator rotated the handle about its axis 57 in the rotational direction of either of the arrows 32, the vessel 10 would rotate about its center of gravity 12 in the direction of arrows 62. The rotational motion of the vessel 10 would causing the bow 16 or stern 19 to move toward the object and cause a potential collision. Accordingly, movement of the handle 54 in the direction of either of the rotational arrows 32 or the lateral arrow 33 will prompt the collision detection system 14 to generate a collision warning.

The joystick device 50 may have one or more adjustable displays 69 which may be on the handle 54 or the housing 52 of the joystick. The adjustable display 69 may be adjusted based on the control mode and/or in response to movement of the handle 54. The adjustable display 69 may be located anywhere on the joystick, including the handle 54 and the housing 52, and may be any type of display that is adjustable to display information as described herein. In exemplary embodiments, the adjustable display 69 may comprise any one or more of an adjustable indicator light or an electronic display, such as a light-emitting diode (LED) display, a liquid-crystal display (LCD), an electronic-paper display, an electro-luminescent display (ELD), or a plasma-display panel (PDP). In one such embodiment, the adjustable display may be a set of indicator lights that are independently illuminable to indicate the control mode of the joystick device 50 or control options available to an operator by moving the handle 54 in specified directions.

FIGS. 3A and 3B depict an exemplary embodiment of a joystick device 50 having handle 54 and housing 52. The depicted embodiment has two adjustable displays, an upper display 69a on a top portion of the handle 54 and a lower display 69b on the housing 52 at the base of handle 54. The joystick device 50 may have additional user interface elements thereon, such as push buttons or touch screen elements for selecting a control mode, such as for activating the collision detection system 14.

In the embodiment of FIGS. 3A and 3B, the upper display 70 may provide a visual collision warning 72, which in the depicted embodiment, is the word "warning" on the upper display 69a. The visual indicator 72 may be an indicator light or, in embodiments where the adjustable display 69 an electronic display, the visual collision warning 72 may be displayed on the electronic display. Alternatively or additionally, the adjustable display 69 may include a lower display 69b in place of or in conjunction with the upper display 69a. In the embodiment of FIGS. 3A-3B, the lower display 69b is an illuminable ring 81, which is a circular light display that surrounds the base of the handle 54. The illuminable ring 81 may be illuminated in its entirety, or portions of the illuminable ring 81 may be illuminated. For example, the illuminable ring 81 may blink, provide a trailing light around the circumference in a clockwise or counter-clockwise direction, or may otherwise provide an illumination pattern that indicates a collision warning. In one example, a portion of the illuminable ring associated with the direction of the object 65 with respect to the marine vessel 10 may illuminate. For example, in the situation depicted in FIG. 3B, a portion of the right side of the illuminable ring 81 may illuminate when the operator moves the joystick handle 54 rightward to indicate the location of the object 65 on the starboard side of the vessel 10. Furthermore, the illuminable ring 81 may be illuminated in one or more different colors and/or intensities, which may further be employed to convey information about the object 65, such as its proximity, location size, etc.

Figure 4:
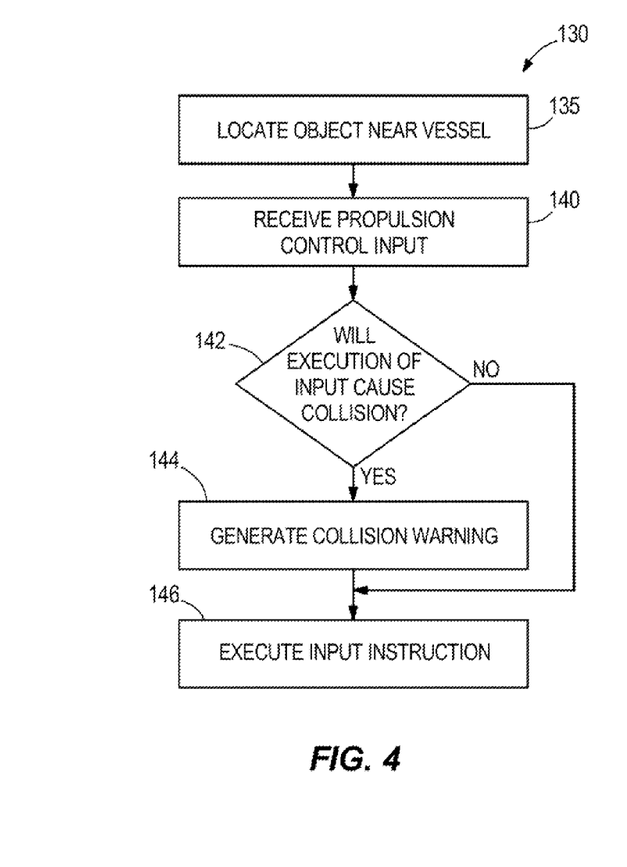
FIG. 4 is a flowchart demonstrating one embodiment of a method of detecting a collision of the marine vessel.

FIG. 4 depicts one embodiment of a method 130 of detecting a collision of a marine vessel. At step 135, an object is sensed near the marine vessel 10 by one or more distance sensors 89. At step 140, a propulsion control input is received, for example via the joystick device 50. At step 142, the control unit 116 determines whether execution of the propulsion control input will cause a collision. If so, a collision warning is generated at step 144. Regardless, the propulsion input instruction is executed at step 146.

Figure 5:
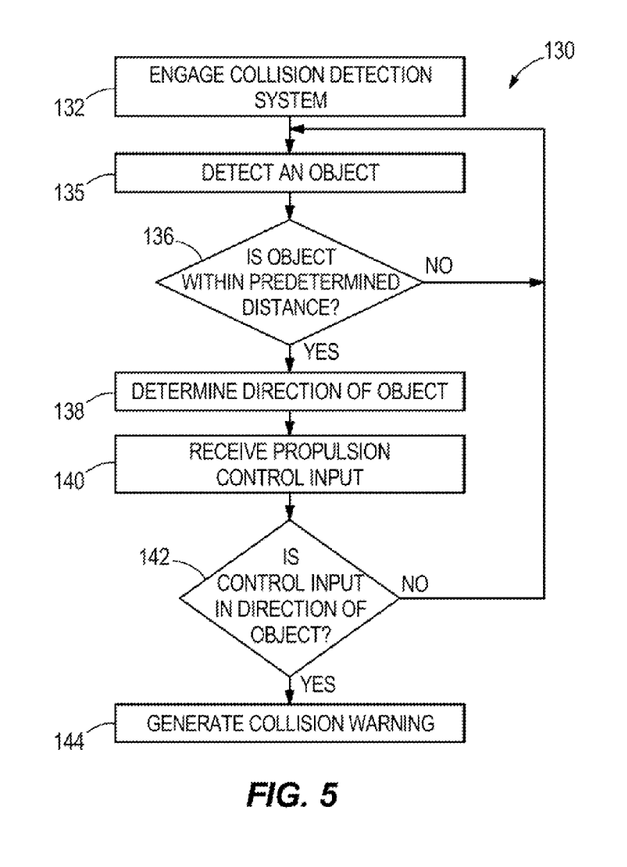
FIG. 5 is a flowchart demonstrating another embodiment of a method of detecting a collision of the marine vessel.

FIG. 5 depicts another embodiment of the method 130 of detecting the collision of a marine vessel. The collision detection system 14 is engaged at step 132. An object is detected at step 135 by one or more distance sensors 89. At step 136, the control unit 116 determines whether the detected object is within a predetermined distance. If the detected object is not within the predetermined distance, then no further action is taken and the system 14 waits for further information from the one or more distance sensors 89. If the object is within the predetermined distance at step 136, then the control unit 116 determines the direction of the object at step 138. A propulsion control input is received at step 140, and then the control unit 116 determines at step 142 whether the propulsion control input is in the direction of the object. If the control input does not cause the marine vessel 10 to move in the direction of the object, then the system 14 takes no action and waits for further input from distance sensors 89 and/or from the propulsion control input device. If at step 142 the propulsion control input is in the direction of the object, than a collision warning is generated at step 144.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A method of detecting a collision of a marine vessel, the method comprising:
    sensing using distance sensors whether an object is within a predetermined distance of a marine vessel;
    determining a direction of the object with respect to the marine vessel;
    receiving a propulsion control input at a propulsion control input device;
    if the object is within the predetermined distance, determining whether execution of the propulsion control input will move any portion of the marine vessel in the direction of the object;
    generating a collision warning only if execution of the propulsion control input will move any portion of the marine vessel in the direction of the object; and
    wherein generating the collision warning includes illuminating an indicator light; and
    wherein the indicator light is an illuminable ring on the propulsion control input device, and wherein the step of illuminating the indicator light includes illuminating a portion of the illuminable ring corresponding to the direction of the object with respect to the marine vessel.

2. The method of claim 1, wherein generating a collision warning includes generating an auditory warning.

3. The method of claim 1, wherein generating the collision warning further includes generating a vibration in the propulsion control input device.

4. The method of claim 1, wherein the predetermined distance is less than ten feet.

5. The method of claim 1, wherein the predetermined distance is less than five feet.

6. A system for detecting a collision in a marine vessel, the system comprising:

a propulsion control input device that receives input from an operator to control propulsion of a marine vessel;

at least one distance sensor that senses a distance of an object from the marine vessel;

a control unit operably connected to the propulsion control input device and the at least one distance sensor;

wherein the control unit determines if the distance of the object is less than a predetermined distance and determines a direction of the object with respect to the marine vessel;

if the object is within the predetermined distance, the control unit further determines whether execution of the propulsion control input will result in a collision;

a collision warning indicator operably connected to the control unit, wherein the control unit controls the collision warning indicator to provides a collision warning only if execution of the propulsion control input will result in a collision;

wherein the propulsion control input device is a joystick device, and wherein the collision warning indicator is an indicator light on the joystick device that illuminates to provide the collision warning; and wherein the indicator light is an illuminable ring on the propulsion control input device having separately-illuminable portions, and wherein the collision warning includes illumination of a portion of the illuminable ring corresponding to the direction of the object with respect to the marine vessel.

7. The system of claim 6, wherein the at least one distance sensor is one of a radar sensor and an ultrasonic sensor.

8. The system of claim 6, wherein the collision warning indicator further includes an electronic display on the marine vessel operable to display a visual collision warning.

9. The system of claim 6, wherein the collision warning indicator further includes an indicator light on a dash of the marine vessel that illuminates to provide the collision warning.

10. The system of claim 6, wherein the collision warning indicator further includes a vibration device that vibrates the propulsion control input device to provide the collision warning.

11. The system of claim 6, wherein the collision warning indicator further includes a speaker that emits an auditory collision warning.

12. The system of claim 6, wherein the predetermined distance is less than five feet.

13. A method of detecting a collision of a marine vessel, the method comprising:

sensing using distance sensors whether an object is within a predetermined distance of a marine vessel;

determining a direction of the object with respect to the marine vessel;

receiving a propulsion control input at a propulsion control input device;

comparing, at a control unit, the propulsion control input to the predetermined distance and the direction of the object;

determining at the control unit whether execution of the propulsion control input will result in a collision; and generating a collision warning by illuminating a portion of illuminable ring on the propulsion control input device corresponding to the direction of the object with respect to the marine vessel.

* * * * *

UNITED STATES PATENT AND TRADEMARK OFFICE
CERTIFICATE OF CORRECTION

PATENT NO. : 9,927,520 B1
APPLICATION NO. : 14/807217
DATED : March 27, 2018
INVENTOR(S) : Aaron J. Ward and Matthew David Jarrell Page 1 of 1

It is certified that error appears in the above-identified patent and that said Letters Patent is hereby corrected as shown below:

In the Claims

In Claim 6, at Column 11, Line 16: "provides" should instead read --provide--.

Signed and Sealed this
First Day of May, 2018

Andrei Iancu
*Director of the United States Patent and Trademark Office*